United States Patent

Henderson

[11] Patent Number: 5,203,654
[45] Date of Patent: Apr. 20, 1993

[54] REPLACEABLE TANG AND TOOL COMBINATION

[76] Inventor: Jerry N. Henderson, 1456 McKinley St., Eugene, Oreg. 97402

[21] Appl. No.: 859,830

[22] Filed: Mar. 30, 1992

[51] Int. Cl.⁵ ............................................. B23B 51/02
[52] U.S. Cl. ................................................... 408/226
[58] Field of Search ............... 408/226, 239 R, 233; 279/103, 89, 7, 99; 76/108.6, 108.1; 409/234; 407/30, 53

[56] References Cited

U.S. PATENT DOCUMENTS

| | | | |
|---|---|---|---|
| 789,866 | 5/1905 | Miller | 408/233 |
| 817,377 | 4/1906 | Kootz et al. | 408/226 |
| 837,322 | 12/1906 | Miller | 279/103 X |
| 1,027,039 | 5/1912 | Down | 279/103 |
| 1,156,336 | 10/1915 | Wegland | 279/99 |
| 1,191,717 | 7/1916 | Moore | 408/226 X |
| 1,475,514 | 11/1923 | Ross | 408/226 |
| 4,773,800 | 9/1988 | Furuhashi et al. | 409/234 |
| 4,818,161 | 4/1989 | Cook | 409/233 |
| 5,037,254 | 8/1991 | Asberg | 279/89 X |

FOREIGN PATENT DOCUMENTS 670370 12/1938 Fed. Rep. of Germany ...... 408/226
24122 of 1914 United Kingdom ................. 279/99

Primary Examiner—Daniel W. Howell
Attorney, Agent, or Firm—James D. Givnan, Jr.

[57] ABSTRACT

A tool including a tapered shank for installation in the chuck of a machine tool. The tapered shank includes a threaded bore in which is received a detachable tang. The tang includes a threaded segment as well as an exposed segment with flats thereon. A shoulder on the tang abuts the end of the tapered shank. A relieved segment in one version of the tang is of lesser cross sectional area than the threaded segment and constitutes a zone where fracture can occur if excessive torque is applied.

2 Claims, 1 Drawing Sheet

REPLACEABLE TANG AND TOOL COMBINATION

BACKGROUND OF THE INVENTION

The present invention pertains generally to machine powered tools of the type having a tang.

Typically tang equipped tools, such as drills and reamers, include a tapered shank for seated engagement within a socket defined by a corresponding taper in the chuck or other powered drive component of a machine. Excessive torque applied to the tang can fracture or bend same when tool rotation is obstructed to render the tool thereafter useless regardless of only the tang being damaged.

SUMMARY OF THE PRESENT INVENTION

The present invention is embodied in a power driven tool including a replaceable tang to permit full utilization of the tool by replacement of a damaged or fractured tang.

In the present combination, the tapered shank of a machine tool is internally threaded to receive the tang. The present tang may, if desired, include a relieved portion of predetermined strength to provide a fracture area which fractures upon excessive torque loading of the tool.

Important objectives of the present invention include the provision of a tool combined with a tapered shank provided with a replaceable tang to reduce tool expense by permitting full utilization of a tool regardless of damage occurring to the tang which damage would otherwise prematurely shorten the life of the tool; the provision of a tool having a replaceable tang which may have a fracture zone therein to locate any fracture at a desired point and at a predetermined torque loading; the provision of a replaceable tang to permit the salvaging of an existing sizeable quantity of damaged tools providing a substantial savings to the user.

DETAILED DESCRIPTION OF THE PREFERRED EMBODIMENTS

Figure 1:
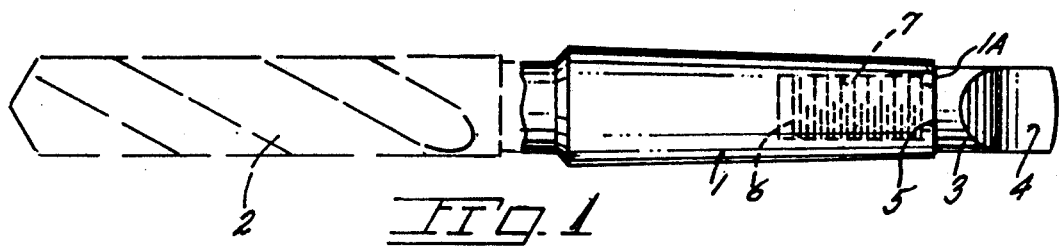
FIG. 1 is a fragmentary side elevational view of a tool having a tapered shank equipped with a removable tang.
Figure 2:
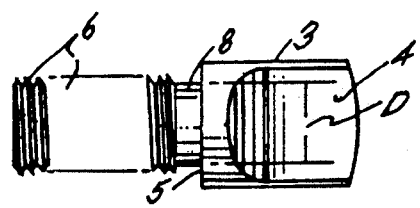
FIG. 2 is an enlarged side elevational view of a tang of the present invention.
Figure 3:
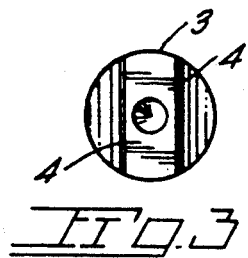
FIG. 3 is an end elevational view taken of the right hand end of FIG. 2.

With continuing attention to the drawings wherein applied reference numerals indicate parts similarly hereinafter identified, the reference numeral 1 indicates the tapered shank of a tool as for example a drill at 2 integral with the shank. Various machine powered tools utilize a tapered shank terminating at one end in a tang.

The present combination includes a tang component 3 having an end segment with torque receiving surfaces or flats 4. An annular shoulder 5 on the tang member 3 is adapted for abutment, when the tang member is seated against an annular end wall 1A of the tapered shank.

Tang member 3 includes a threaded stud segment 6 for threaded engagement with an internally threaded bore 7. Bore 7 is of a length to assure seating of tang component shoulder 5 against end wall 1A of shank 1.

Figure 4:
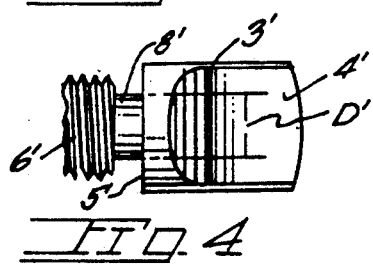
FIG. 4 is a view similar to FIG. 2 but showing a variation in a fracture zone of a modified tang.

Intermediate the inner end of threaded segment 6 of the tang component and shoulder 5 thereof is an additional segment providing a fracture or failure zone at 8. A diameter of said zone is indicated at D. The fracture zone may vary in cross section as at 8' having a further reduced diameter at D' less than the diameter of the threads 6' in FIG. 4. Beyond physical changes in the failure zone, failure may be predetermined by properties of the steel. Still further, the zone 8 may be otherwise altered for purposes of determining at what amount of torque on the tang fracture will occur. Such other alterations may include the contour of the zone particularly where it merges with shoulder 5 and with threaded segment 6. For example, a radiussed fillet between zone 8 and shoulder 5 and/or threaded segment 6 will serve to increase zone strength.

The present combination may be included in new tools with a spare tang being provided, if desired, to the tool purchaser. Further, the present combination may be achieved by the machining of an existing damaged tool having a broken or damaged tang by the drilling and tapping of the tool shank and the installation of the presently disclosed tang. In machine shops it is envisioned that a substantial quantity of damaged tools may be salvaged by the present combination and effect a considerable cost savings to the shop owner. The purchaser of the present combination may be provided with tangs having different torque transmitting capability to assure protection of the tool.

While I have shown but one embodiment of the invention, it will be apparent to those skilled in the art that the invention may be embodied still otherwise without departing form the spirit and scope of the invention.

Having thus described the invention, what is desired to be secured by a Letters Patent is:

1. A tang for a machine powered tool having a tapered shank defining an internally threaded bore, said tang comprising, a threaded segment for installation in said bore, an end segment having a distal end, a pair of torque receiving flats on said end segments terminating at the distal end of the end segment, a shoulder for abutment with said shank, and, an additional segment intermediate said shoulder and aid threaded segment and having a cross sectional area less than the cross sectional area of said threaded segment to provide a fracture zone susceptible to fracture prior to fracture of the tool during tool use.

2. The tang claimed in claim 1 wherein said treaded segment is of cylindrical shape with straight threads.

* * * * *